April 23, 1957  A. F. SANDERS  2,789,546
COMBUSTION SPACES OF FUEL-INJECTION ENGINES
Filed March 25, 1955
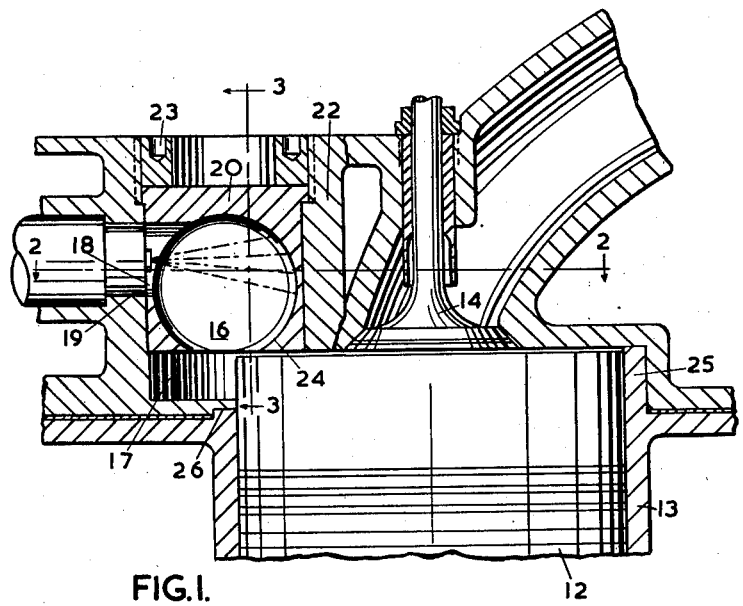
FIG.I.
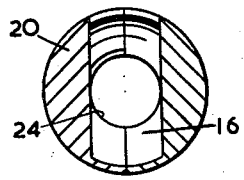
FIG.2.
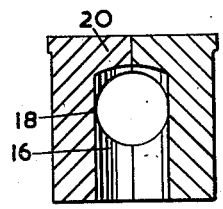
FIG.3.
INVENTOR
A. F. SANDERS
ATTYS.

United States Patent Office 2,789,546
Patented Apr. 23, 1957

2,789,546

COMBUSTION SPACES OF FUEL-INJECTION ENGINES

Arthur Freeman Sanders, Penzance, Cornwall, England

Application March 25, 1955, Serial No. 496,640

Claims priority, application Great Britain July 23, 1954

5 Claims. (Cl. 123—32)

This invention relates to a fuel-injection engine, which may operate entirely by compression ignition, or may, alternatively, be provided with a separate ignition means to assist or replace compression ignition.

More particularly, the engine to which the invention relates is a modification of a known engine in which there is an injection cavity, of truncated spherical shape, adjacent a reception cavity. The reception cavity may be cresent-shaped or circular, the axis being parallel to the cylinder axis; and is overhung entirely or in part by a sharp-edged lip at the truncated end of the injection cavity.

I now find that for relatively-small engines, i. e., for engines having a cylinder bore of less than ten centimetres, it is advisable to obtain a greater fuel spray length in the injection cavity than would be obtained in the case of a part-spherical cavity as above-mentioned, i. e., in a direction generally at right-angles to the cylinder axis.

In order to achieve this result, I propose to utilise a somewhat larger injection cavity as viewed in a central vertical plane along the fuel spray, which will provide the extra length of spray; but, instead of the cavity being in the form of a truncated sphere, it will be in the form of a narrowed truncated sphere—i. e., the walls of the truncated sphere on opposite sides of the fuel spray may be made parallel to one another and spaced as desired.

In an extreme case, the normally-part-spherical walls would be flattened to be a distance apart from one another which would be equal to the opening for the fuel nozzle, and also to the opening at the truncated end of the injection chamber—which is preferably still circular.

In the accompanying drawings:

Figure 1 is a fragmentary sectional elevation through the combustion chamber of an engine according to the invention; and Figures 2 and 3 are sections, through the block in which the injection cavity is formed, mainly on the lines 2—2 and 3—3 respectively of Figure 1.

The drawings show a piston 12 reciprocable in a cylinder 13 as far as is possible (allowing for mechanical reasons) towards the combustion end of the cylinder, one of the valves being indicated at 14.

The main combustion space comprises an injection cavity 16, into which injection is effected, which is of circular, part-spherical shape, and a reception cavity 17. The opening for the injector nozzle is indicated at 18, and the nozzle at 19.

In the example shown in the drawings, the injection cavity 16 is formed in a plug 20 (shown in Figures 2 and 3 as comprising two blocks) which is held in position in the cylinder head 22 by means of a ring nut 23, and the plug 20 is entirely at the end of the piston. The reception cavity 17, which in this example is crescent-shaped, communicates with the truncated end 24 of the injection cavity and is to one side of the piston at the top-dead-centre position of the latter, which is also formed in the cylinder head.

The upper end 25 of the cylinder, which spigots into the adjacent shaped portion of the cylinder head 22, is cut away as shown at 26 so as to receive the floor of the reception cavity. The opening of the truncated end 24 between the injection and reception cavities is in this case circular, the diameter of this opening not exceeding that of the opening 18. The reception cavity is partly overhung by a sharp-edged lip 28 round the opening at the truncated end 24 of the injection cavity.

Figures 2 and 3 indicate the shape of the injection cavity in an extreme case. The normally-part-spherical walls are shown at 30 as flattened, being a distance apart from one another which equals the opening 18.

Obviously, it is not essential that these flattened walls 30 should be parallel to one another, though this is very convenient from the point of view of machining them. Nor, it will be understood, is it essential that they should be as close to one another as is shown in Figures 2 and 3.

What I claim as my invention and desire to secure by Letters Patent of the United States is:

1. A fuel-injection engine having a cylinder, a cylinder head, a piston which is reciprocable towards the cylinder head so as to leave a minimum clearance therewith such as is necessary for mechanical reasons, the cylinder head having in it an injection cavity, into which the fuel is injected, the injection cavity being formed by two opposite flat walls of substantially circular shape peripherally interconnected by a part-spherical wall and being wholly at a level above the cylinder bore, the engine also providing a chamber for receiving fuel from the injection cavity which extends outwardly from the upper periphery of the cylinder bore and below the outer end face of the piston at the top-dead-centre position and communicating with the injection cavity through a sharp-edged opening, the wall of the injection cavity adjacent said opening overhanging at least a part of the fuel receiving means, and a fuel injector nozzle the axis of which extends along a diametrical line of the cylinder and substantially parallel to said opening.

2. A fuel-injection engine having a cylinder, a cylinder head, a piston which is reciprocable towards the cylinder head so as to leave a minimum clearance therewith such as is necessary for mechanical reasons, the cylinder head having formed in it the main compression space comprising an injection cavity into which the fuel is injected, and a chamber for receiving fuel from the injection cavity, the injection cavity being in the form of a substantially cylindrical space wholly above the piston and with its axis generally parallel to the inner surface of the cylinder head, the fuel receiving chamber extending outwardly from the upper periphery of the cylinder bore and below the outer end face of the piston at the top-dead-centre position and communicating with the injection cavity through a sharp-edged opening, the wall of the injection cavity adjacent said opening overhanging at least a part of the fuel receiving chamber, and a fuel injector nozzle the axis of which extends along a diametrical line of the cylinder and substantially parallel to said opening.

3. A fuel-injection engine having a cylinder, a cylinder head, a piston which is reciprocable towards the cylinder head so as to leave a minimum clearance therewith such as is necessary for mechanical reasons, the cylinder head having in it an injection cavity into which the fuel is injected, the injection cavity being of circular shape and wholly above the piston, with an opening at the cylinder end and with its opposite sides adjacent the opening flattened, the engine also providing a chamber for receiving fuel from the injection cavity which extends outwardly from the upper periphery of the cylinder bore and below the outer end face of the piston at the top-dead-centre position and communicating directly with the injection cavity through said opening, the wall of said injection cavity adjacent said opening overhanging at least a part of the fuel receiving chamber, and a fuel injector nozzle the axis of which extends along a diametrical line of the cylinder and substantially parallel to said opening.

4. A fuel-injection engine having a cylinder, a cylinder head, a piston which is reciprocable towards the cylinder head so as to leave a minimum clearance therewith such as is necessary for mechanical reasons, the cylinder head having in it an injection cavity into which the fuel is injected, the injection cavity being in the form of a circular space of part-spherical shape and being wholly above the piston at the top-dead-centre position of the piston, the engine also providing a chamber for receiving fuel from the injection cavity which extends outwardly from the upper periphery of the cylinder bore and below the outer end face of the piston at the top-dead-centre position and communicating with the injection cavity through a sharp-edged circular opening, the wall of the injection cavity adjacent said opening overhanging at least a part of the fuel receiving chamber, the walls of the injection cavity being parallel and at right-angles to the circular opening and spaced apart substantially equal to the circular opening, and a fuel injector nozzle the axis of which extends along a diametrical line of the cylinder and substantially parallel to the circular opening.

5. A fuel-injection engine having a cylinder, a cylinder head, a piston which is reciprocable towards the cylinder head so as to leave a minimum clearance therewith such as is necessary for mechanical reasons, the cylinder head having formed in it a circular cavity into which the fuel is injected, said circular cavity having two flat opposite side walls, a fuel-injection nozzle arranged to direct its spray substantially diametrically across the circular injection cavity, the portion of said injection cavity adjacent the piston being truncated and communicating with a chamber for receiving fuel from the injection cavity, the chamber being formed adjacent the injection cavity, the opening between the cavity and chamber being a circular sharp-edged opening, said flat walls substantially at right angles to the plane of said opening, the wall provided with the sharp edge of the injection cavity overhanging the fuel receiving chamber round some of the opening between the injection cavity and fuel receiving chamber.

References Cited in the file of this patent
UNITED STATES PATENTS

| | | |
|---|---|---|
| 1,954,644 | Oberhaensli | Apr. 10, 1934 |

FOREIGN PATENTS

| | | |
|---|---|---|
| 372,754 | Italy | July 8, 1939 |
| 882,594 | France | Mar. 1, 1943 |